Oct. 28, 1924. 1,513,377

J. F. DONNELLY ET AL

TAP SPLITTING MACHINE

Filed June 29, 1923 2 Sheets-Sheet 1

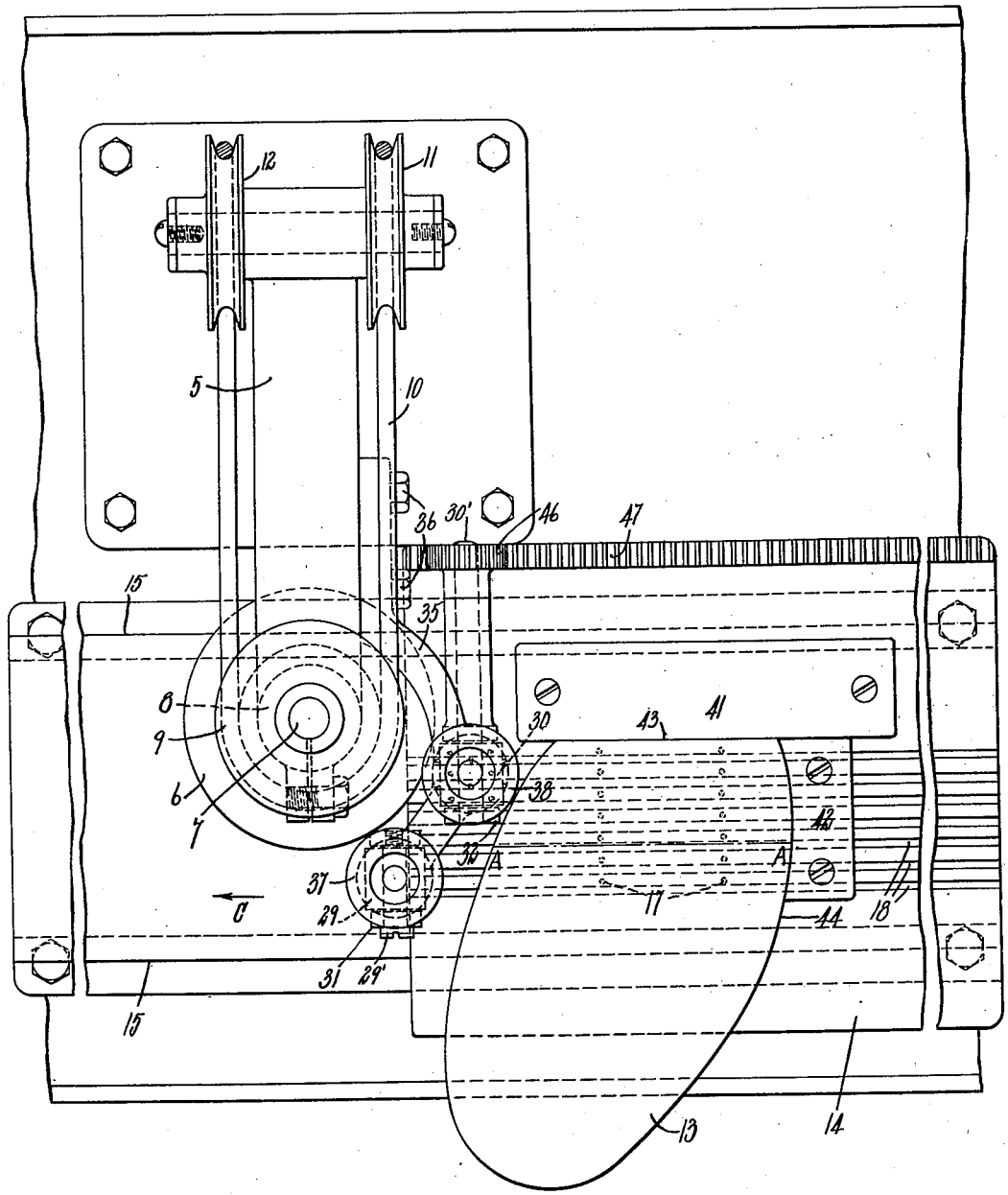

Patented Oct. 28, 1924.

1,513,377

UNITED STATES PATENT OFFICE.

JOHN F. DONNELLY AND ERNEST S. JOHNSON, OF BROCKTON, MASSACHUSETTS, ASSIGNORS, BY MESNE ASSIGNMENTS, TO PANCO RUBBER COMPANY, OF CHELSEA, MASSACHUSETTS, A CORPORATION OF MASSACHUSETTS.

TAP-SPLITTING MACHINE.

Application filed June 29, 1923. Serial No. 648,519.

*To all whom it may concern:*

Be it known that we, JOHN F. DONNELLY and ERNEST S. JOHNSON, citizens of the United States, residing at Brockton, in the county of Plymouth and State of Massachusetts, have invented new and useful Improvements in Tap-Splitting Machines, of which the following is a specification.

This invention relates to a machine for splitting taps for boots and shoes, a portion of the length of the tap being split in order that a piece of tape may be inserted therein.

It is the custom with certain styles of taps for boots and shoes which are made of rubber or rubber composition, to split the said taps for a portion of their length from the rear end thereof, in order that a piece of tape or other reinforcing material may be inserted between the split portions of the tap, so that when the tap is nailed to the shoe the nails will hold firmly in the tape and will not be pulled through the rubber when subjected to the usual strains of wear.

The object of the invention is to provide a simple, accurate and easily operated machine for rapidly and accurately splitting taps in the manner hereinafter set forth.

The invention consists in the combination and arrangement of parts set forth in the following specification and particularly pointed out in the claims thereof.

Referring to the drawings:—

Fig. 2 is a plan view of the same, partly broken away to save space in the drawings, and also illustrating a tap in position to be fed to the cutter.

Like numerals refer to like parts throughout the several views of the drawings.

Figure 1:
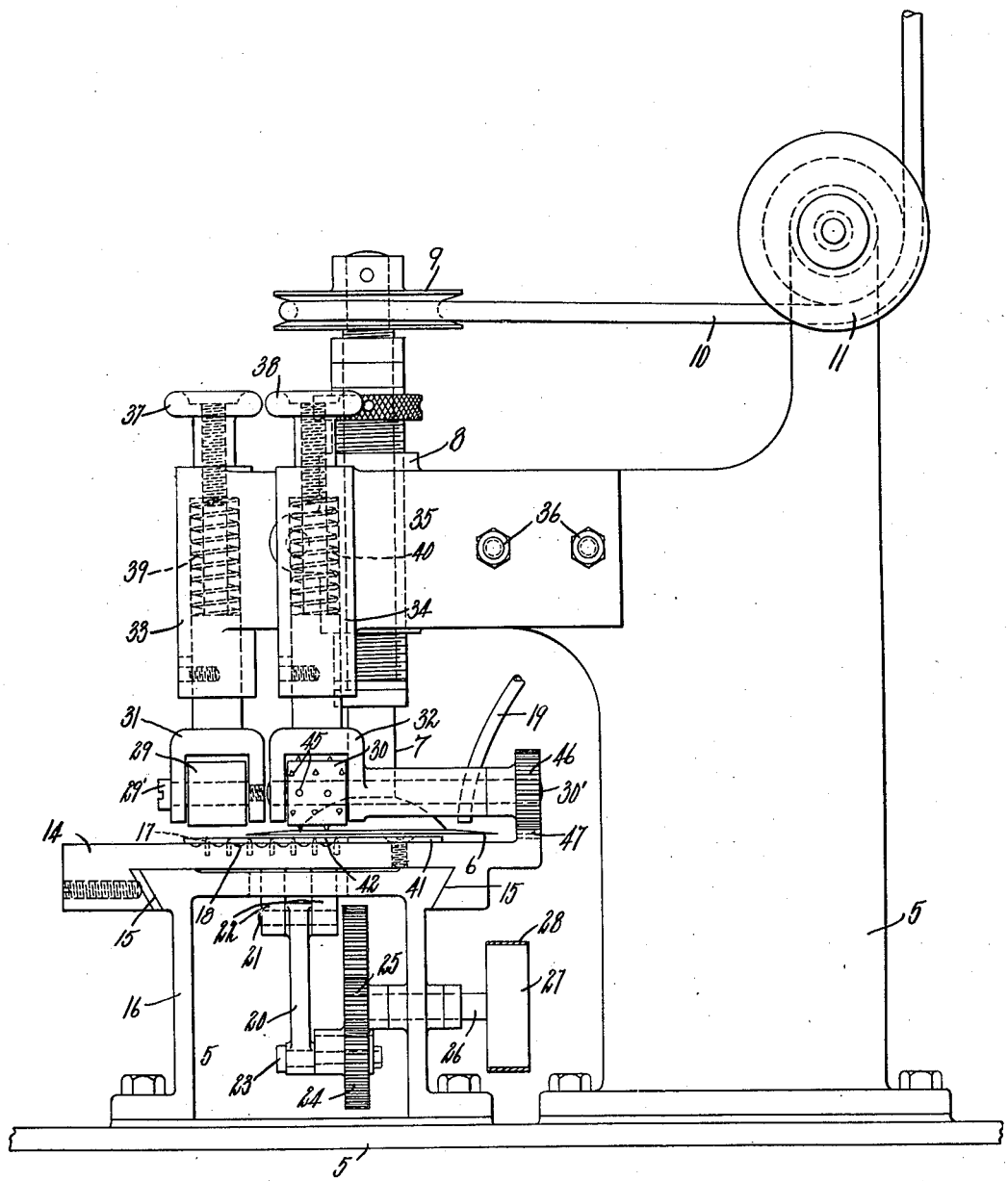
Figure 1 is a side elevation of a machine for splitting taps embodying our invention.

In the drawings, 5 is the frame of the machine. 6 is the cutter which is fastened to a vertical shaft 7 rotatably mounted in a bearing 8 in the frame of the machine. The shaft 7 is rotated by a pulley 9 fast to the upper end thereof and driven by a belt 10 which extends rearwardly therefrom over idler pulleys 11 and 12 and is driven in the usual manner by a pulley not shown in the drawings.

A tap 13 is placed upon a slide 14 constituting a holder and guided on ways 15 provided upon the base 16 of the frame 5. Pins 17 are provided upon the slide 14 and project upwardly into the tap 13 which is pressed downwardly thereon prior to being fed to the cutter. The upper surface of the slide 14 is provided with grooves 18 and water is fed to the cutter and to the tap by a pipe 19 in order to assist in the cutting operation and prevent the knife 6 from becoming heated. A reciprocatory motion is imparted to the slide 14 by a connecting rod 20 which is pivotally connected at one end thereof at 21 to a pair of downwardly depending ears 22 on the slide 14. At the other end thereof said connecting rod is pivotally connected by a stud 23 to a gear 24, said stud constituting a crank pin. The gear 24 is rotated by a pinion 25 which is fastened to a shaft 26 rotatably mounted in the base 16 and driven by a pulley 27 and belt 28.

The tap is fed forward to the cutter 6 by the slide 14 and is held firmly in position and pressed downwardly upon the table 14 by a pair of rolls 29 and 30. The roll 29 is an idler roll and is rotatably mounted upon a stud 29'. The roll 30 is fast to a shaft 30' and has feed projections 45 projecting from its periphery and adapted to engage the upper surface of the tap 13 during the feeding operation. The stud 29' is fast to a vertical slide 31 and the shaft 30' is rotatably mounted in a vertical slide 32. The slides 31 and 32 are slidably mounted in bearings 33 and 34 provided on a head 35, which is fastened by bolts 36 to the frame of the machine. The upper ends of the slides 31 and 32 are screw threaded to receive adjusting nuts 37 and 38 respectively. Springs 39 and 40 are provided to force the slides 31 and 32 and their respective rolls 29 and 30 downwardly against the tap 13 while it is being fed to the cutter.

A positive rotation is imparted to the shaft 30' and to the roll 30 to assist the slide 14 in feeding the tap to the cutter by a gear 46 fastened to the rear end of said shaft 30' and meshing into a rack 47 provided upon the slide 14 so that as the slide 14 is reciprocated, a rotary motion may be imparted to the gear 46, the shaft 30' and the roll 30.

In order to position the tap accurately upon the slide, so that when it is fed forward to the cutter it may be split for a portion of its length only, gauges 41 and 42 are provided which are screwed to the top of the slide. The gauge 41 is so positioned upon the slide 14 that the straight rear end 43 of the tap shall rest thereagainst and one edge 44 of the tap will rest against the gauge 42.

The general operation of the mechanism hereinbefore specifically described is as follows:—

The tap which is to be split is placed upon the slide 14 and thrust downwardly upon the projections 17. The slide 14 is then fed forward toward the cutter 6 and carries the rear end of the tap 13 into engagement with said cutter. The tap is fed past the cutter 6 by the slide 14 and roll 30 and is slit along the broken line A—A, Fig. 2, and is then removed from the slide which, upon its return movement, is carried to the position illustrated in the drawings, ready to have another tap attached thereto. During the forward movement of the slide, or while it is moving in the direction of the arrow c, Fig. 2, the tap is engaged by the rolls 29 and 30 and held firmly pressed against the upper surface of the slide 14 and in engagement with the projections 17 during the cutting operation, whereby the tap is accurately positioned relatively to the cutter and is split midway between the upper and lower surfaces thereof. During the cutting operation, water drips upon the cutter and upon the tap from the pipe 19 and runs from the tap and cutter along the grooves 18 and off of the machine.

In the drawings we have illustrated the projections 17 as consisting of pins inserted in the slide 14, but it is evident that without departing from the spirit of this invention other projections than pins may be employed, such for example, as sharp V-shaped corrugations extending transversely of the upper surface of the slide 14 and intersecting the grooves 18, preferably at right angles.

We claim:

1. A machine for splitting taps having, in combination, a rotary cutter, a reciprocating slide for holding a tap and presenting it to the cutter in a plane parallel to the face of the cutter, a feed roll for engaging the tap on the side opposite from the slide, and connections between the slide and the feed roll for positively rotating the latter.

2. A machine for splitting taps having, in combination, a rotary cutter, a reciprocating holder having projections adapted to engage one side of the tap and to be moved toward the cutter to split the tap to a depth of cut less than the length of the tap, a feed roll having projections adapted to engage the opposite side of the tap, and a rack and gear connection between the holder and feed roll for positively rotating the latter as the holder is moved.

3. A machine for splitting taps having, in combination, a rotary cutter, a slide constituting a holder adapted to position a tap in a plane parallel to the face of the cutter and adapted to be reciprocated relatively to the cutter to split the tap, a feed roll engaging the side of the tap opposite from the slide, and spring means for forcing the feed roll toward the tap.

4. A machine for splitting taps having, in combination, a rotary cutter, a slide having projections adapted to engage one side of the tap to feed the tap in a plane parallel to the face of the cutter, a yieldingly mounted feed roll having projections adapted to engage the opposite side of the tap, and connections between the slide and the feed roll for positively rotating the feed roll as the tap is presented to the cutter.

In testimony whereof we have hereunto set our hands in presence of two subscribing witnesses.

JOHN F. DONNELLY.
ERNEST S. JOHNSON.

Witnesses:
FRANKLIN E. LOW,
CHARLES S. GOODING.